Jan. 3, 1961  G. M. NEUMANN  2,966,959
V-SHAPED FILTER CELL HOUSING, AND MEANS
OF SEALING FILTER FRAMES THEREIN
Filed May 28, 1957  7 Sheets-Sheet 2
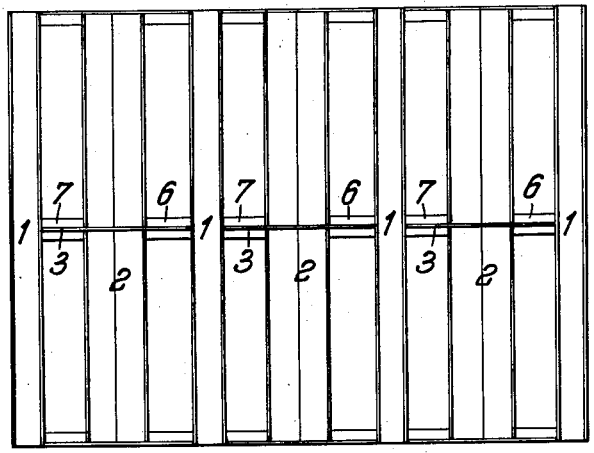
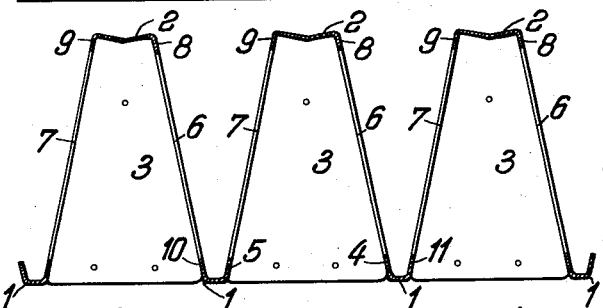
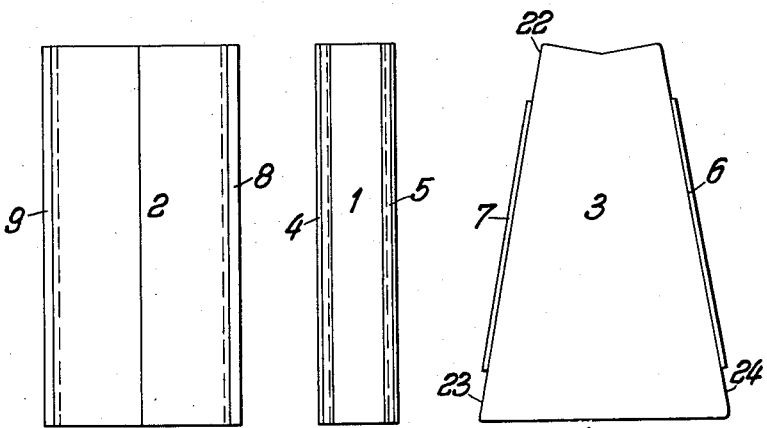
Inventor:

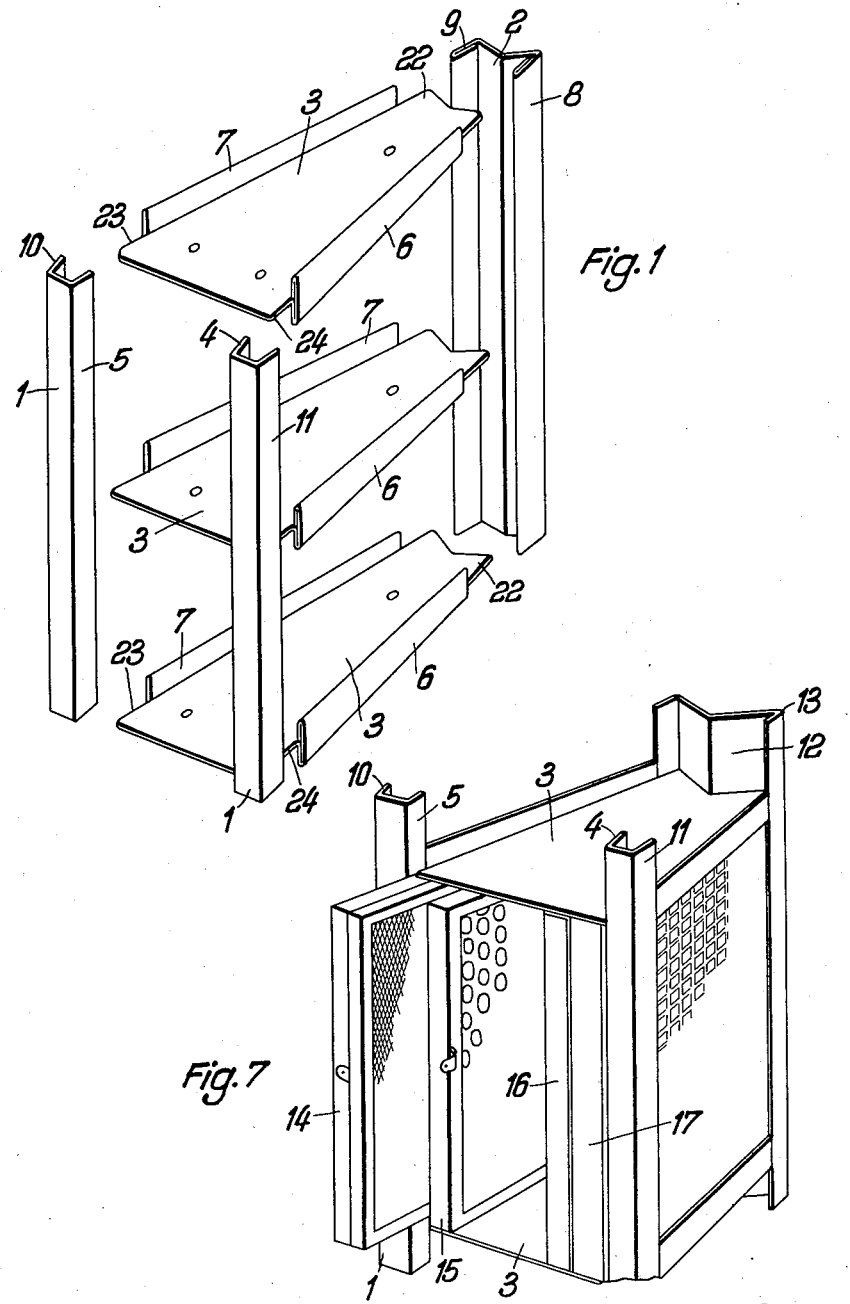

Jan. 3, 1961  G. M. NEUMANN  2,966,959
V-SHAPED FILTER CELL HOUSING, AND MEANS
OF SEALING FILTER FRAMES THEREIN
Filed May 28, 1957  7 Sheets-Sheet 4

Inventor:
Gerhard Max Neumann
by Mentern and Frey
Armand E. Mentern

Jan. 3, 1961 G. M. NEUMANN 2,966,959
V-SHAPED FILTER CELL HOUSING, AND MEANS
OF SEALING FILTER FRAMES THEREIN
Filed May 28, 1957 7 Sheets-Sheet 6

Inventor:

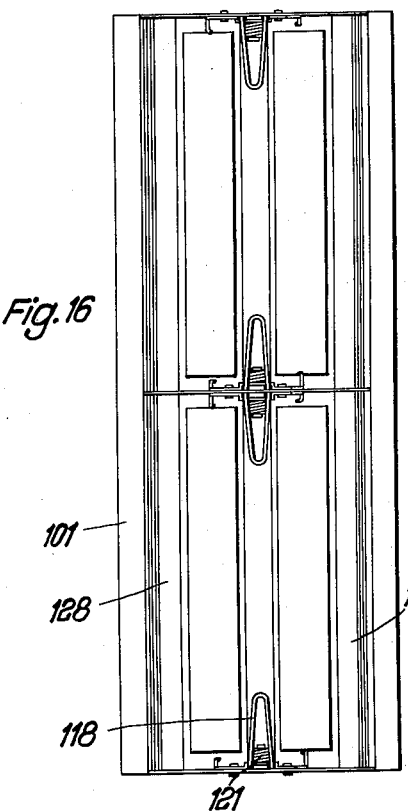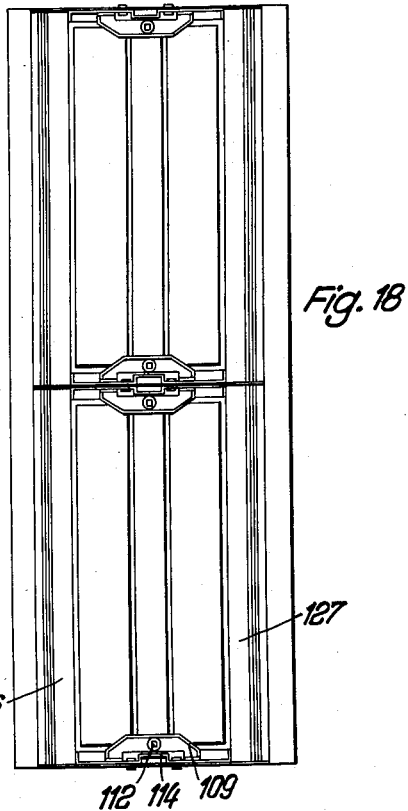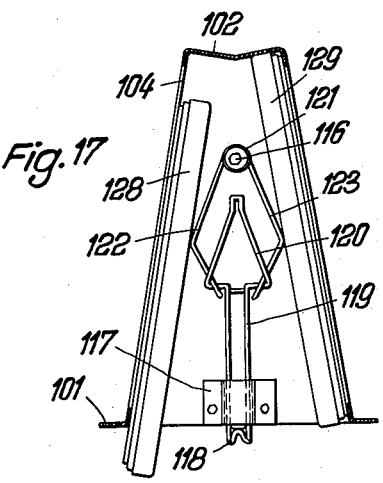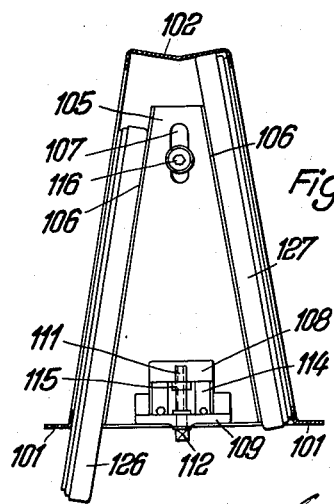

United States Patent Office

2,966,959
Patented Jan. 3, 1961

2,966,959

V-SHAPED FILTER CELL HOUSING, AND MEANS OF SEALING FILTER FRAMES THEREIN

Gerhard Max Neumann, Berlin-Friedenau, Germany, assignor to Delbag-Luftfilter G.m.b.H., Berlin-Halensee, Germany Filed May 28, 1957, Ser. No. 662,100

Claims priority, application Germany May 31, 1956

8 Claims. (Cl. 183—44)

The invention relates to a V-shaped filter cell housing, and to a clamping means for sealing filter frames therein.

The use of V-shaped filters is well known in the art of filtration. In such filters, filter frames are secured in converging arrangement in a housing of V-shaped conformation, one on each side. The resulting V-shaped filter is interposed in the stream of air to be filtered. According to the requisite flow capacity, the V-shaped housings are arranged in rows, the number of unit housings required being assembled to form a filter section. Such assembly of a section comprising a plurality of V-shaped units entails a considerable investment in excess materials, since each unit housing, as a self-contained component, has its own walls and frame, and upon assembly this implies that twice the quantity of materials actually necessary has been used. Furthermore, such known filter sections composed of unit housings have the important disadvantage that special sealing operations are required to prevent leakage of unfiltered air to the pure-air side.

To overcome this disadvantage, the unit housings bolted together have been known to be welded at their edges of mutual contact as well, so as to close any air leaks. This requires long welds, entailing considerable labor and other expense, without entirely eliminating the possibility of unfiltered air leakage, so that as a rule still other operations, such as sealing with putty, are needed in order to stop any leaks left behind after welding. Besides, the extensive welding operations required on such known housings result in distortion, so that after the welding is completed a subsequent straightening operation is necessary to correct for strains set up during welding. Attempts have also been made to seal up the bolted assembly by puttying the joints. However, this procedure is unsatisfactory because, what with forced drying and unavoidable concussion during operation, the putty will crumble and come loose within a comparatively short time.

For these reasons, it has not heretofore been feasible to use filter sections composed of V-shaped unit cells in applications where exacting requirements are to be met and leakage of unfiltered air cannot be tolerated.

The filter housing according to the invention eliminates these disadvantages. It consists, according to the invention, of vertical members arranged on the inlet side and bounding a row of vertically superposed filter cells; in addition, there is another vertical member of preferably M-shaped channel section, the web of which closes off the superposed cells on the outlet side. Between the inlet-side and outlet-side members, according to the invention, trays are mounted at intervals corresponding to the heights of the cells; these trays are provided on their lengthwise edges with vertical flanges extending both upwards and downwards, and connected by welding to the inlet-side members and the outlet-side member.

So that a housing may be constructed with filter cells arranged side-by-side as well as one above another, according to another feature of the invention, the inlet-side members may be in the form of channels whose flanges pertain respectively to the adjacent vertical rows of filter cells on either side.

The vertical flanges on the lengthwise edges of the trays are of such length that the tray will extend from the extreme anterior point of the inlet-side member all the way to the web of the outlet-side member.

In the construction of the filter housing according to the invention, only three different shapes of parts are required, namely the inlet-side channels, the outlet-side M-shaped members, and the vertically flanged trays. Using these three standard parts, filter housings of any desired size can be made up by cutting inlet-side and outlet-side members to the required height of the section and welding a sufficient number of them to trays for the required width of the section. In the housing according to the invention, the need for making long welds is eliminated, since it suffices for the front ends of the flanges along the lengthwise edges of the trays to be welded each to a flange of an inlet-side member and their rear ends to the flanges of the outlet-side member, in order to produce a tight housing reliably sealed against air leakage. It is only at the uppermost and lowermost trays, terminating the section, that additional welds are needed to stop leakage at these points. Within the housing proper, the flanges of the inlet-side and outlet-side members together with the tray flanges welded to them form a filter frame proof against any leakage of air. The housing according to the invention does not suffer any strain in the course of welding operations that would require subsequent straightening, since the shortness of the welds keeps them from causing any excessive thermal distortion. The housing according to the invention is rendered stable and capable of withstanding stresses developed in operation, by virtue of the sound structure of its parts. The flanges of the trays jointly with those of the channels provide a secure and tight bearing surface for the filter frames, without requiring any trimming after welding, since the welds are on the dust side. Filter frames may readily be mounted in the housing according to the invention by means of conventional clamping devices, with the further advantage that the clamping device may be attached to the trays in advance before they are welded in place.

To simplify assembly and welding operations, in further elaboration of the idea of the invention, the trays are provided with projections at the points of engagement with the channels, and the channels are provided with matching recesses at the tray levels. When the trays and channels are so modified, it is possible to assemble the filter housing by engaging the projections on the trays with the recesses in the channels without the aid of special tools or fixtures, and proceed to the final welding operation. Since the filter housing according to the invention, by virtue of its construction, precludes leakage of unfiltered air with complete reliability, it may safely be used in applications where requirements of filtration performance are especially exacting. Since such special filters generally require the use of several filter thicknesses, for example coarse and fine, the web of the channel closing off the vertical row of filter cells on the air-outlet side is so proportioned, in further elaboration of the idea of the invention, that the V-shaped filter cell will accommodate several filter frames on each side, in particular two, placed in series.

In further accordance with the invention, one of the channels bounding a vertical row of filter cells on the inlet side may be fitted, after the manner of a door, with a frame capable of accommodating a third stage or prefilter; when closed, it will obstruct the entrance to the filter cell.

In previously known filter housings, it is necessary for the filter frames to be closely sealed against the housing to prevent leakage. For this purpose, such housings are provided with springs at the points of insertion of the frames, to bear upon the frames and hold them against the housing with their packing and thus seal the joint. When changing filter frames, the used frame is withdrawn from the housing and a new one inserted. During this operation the filter must be stopped, since otherwise unfiltered air would get into the stream of clean air through the open space in the housing. In order firstly to avoid such interruptions of operation, and secondly to adapt such filters to present requirements as to filtration effect, it has been necessary to employ several filter housings in series, the first being fitted with coarse filters and the next with fine filters. Since in a combination of coarse and fine filters, the coarse filter will wear out considerably more quickly than the fine filter, it becomes necessary to change the coarse filter at a time when the fine filter can be left in service. When several filter housings are used in series, therefore, it is possible to change the coarse filters during uninterrupted operation of the filter system.

In further elaboration of the filtration device according to the invention, a clamping means is provided for sealing several filter frames in series into the V-shaped filter cells. An essential feature is that in the arrangement according to the invention, any required bearing pressure of the fine filter can be obtained without requiring the presence of special installation receptacles, so that even in filters for a very high grade of performance, the ordinary filter cell may be employed without difficulty.

This advantage is achieved, according to the invention, in that the top and bottom surfaces of the cell partition or tray are each provided, in the median plane of the cell, with a screw mechanism for applying pressure to the fine-filter frames, as well as a clamping means having a handle, for example a bow clamp, serving to actuate a pressure spring for the coarse-filter frames.

The pressure spring for the coarse-filter frames may comprise a known coil spring arrangement attached to the tray of the housing and having hooked ends on either side to engage the two coarse filters and hold them tight against the fine-filter frames in proper position of the bow clamp actuated by means of the handle.

The pressure mechanism for the fine-filter frames, according to the invention, comprises a wedge-shaped plate having upturned flanges along its two lengthwise edges, paralleling the sides of the V-shaped filter cell; at its posterior, narrow end, the wedge-shaped plate has a lengthwise slot engaging a guide pin attached to the tray. At its anterior end, the plate is cut out to leave sufficient room for the screw-mechanism and bow-clamp members to be attached to the tray, at the bottom.

The arrangement, according to the invention, of a wedge-shaped plate actuated by a screw mechanism for pressing the fine-filter frames in place, makes it possible to obtain any required bearing pressure by suitable setting of the screw mechanism. The pressure springs of the clamping means according to the invention then serve merely to apply pressure to the coarse-filter frames, which never require as much pressure as the fine-filter frames, so that the type of clamping means according to the invention will in fact permit application of the respective required pressures without difficulty and without departing from the normal cell dimensions.

In further elaboration of the invention, the anterior end of the wedge-shaped plate bears a strap bridging the cut-out in the plate, to serve as a purchase for the screw; inside the cut-out, on the tray of the cell, there is another strap bearing the nut of the screw. Both straps are of such height as to leave room underneath for the clamping means pertaining to the coarse-filter frames.

To permit some lateral adjustment of the wedge-shaped plate, the purchase of the screw, according to the invention, comprises a horizontal transverse oblong hole.

Underneath the purchase for the screw, according to the invention, another strap is mounted on the bottom tray to retain the bow clamp for operating the clamping springs. The strap for guiding the bow clamp is matched in size with the one supporting the nut, so that the latter strap also helps guide the bow clamp.

The coil spring with hooked ends is mounted, according to the invention, on the guide pin for the slot in the wedge-shaped plate.

As previously stated, the clamping means according to the invention will permit the application of as high a pressure as necessary to the fine-filter frames, so that filter frames equipped with the device according to the invention may be used for purposes requiring any degree of filtration effect.

The arrangement according to the invention has still another essential advantage, consisting in that the several parts of the clamping means according to the invention may be used in the construction of filter cells optionally equipped with the pressure mechanism for fine-filter elements or with the pressure mechanism for coarse-filter elements, separately or in combination. Using the parts according to the invention, therefore, and without modifying the filter cells, it is possible to meet any sort of requirements, and no alterations either in the parts of the filter cell itself or in the parts of the clamping means will be needed. For example, filter cells may be made up with fine filters only; in that case the clamping means for coarse-filter frames is omitted, without any structural modification at all; alternatively, filter cells may be made up with the clamping means for the coarse-filter frames only, in which case the wedge-shaped plate with screw and nut will not be installed. In this case also, no changes whatever are needed in the housings or parts. Thus the clamping means according to the invention will meet any operating requirements without any change in parts or housings. This is achieved by the arrangement, according to the invention, of a pressure plate with guide straps to accommodate the clamping means for the coarse-filter frames.

The device according to the invention will now be more fully described with reference to the accompanying drawings, but it should be understood that these are given by way of illustration and not of limitation and that many changes in the details may be made without departing from the spirit of the invention.

In the drawings,

Fig. 1 is an exploded perspective view of two cells of an embodiment of a filter housing according to the invention;

Fig. 2 and Fig. 2a respectively show a front view and a top view of a tray;

Fig. 3 and Fig. 3a respectively show a cross section and a back view of an inlet-side channel;

Fig. 4 and Fig. 4a respectively show a cross section and a back view of an outlet-side channel;

Fig. 5 shows a front view of six cells of the housing;

Fig. 6 shows a sectional plan view of the housing of Fig. 5;

Fig. 7 is a perspective view of a filter cell with two frames inserted on each side;

Fig. 16 is a front view of two superposed filter cells with coarse filters inserted, with the aid of their clamping means;

Fig. 17 is a top view corresponding to Fig. 16;

Fig. 18 is a front view of two superposed filter cells with fine filters inserted, with the aid of their clamping means;

Fig. 19 is a top view corresponding to Fig. 18.

Figure 8:
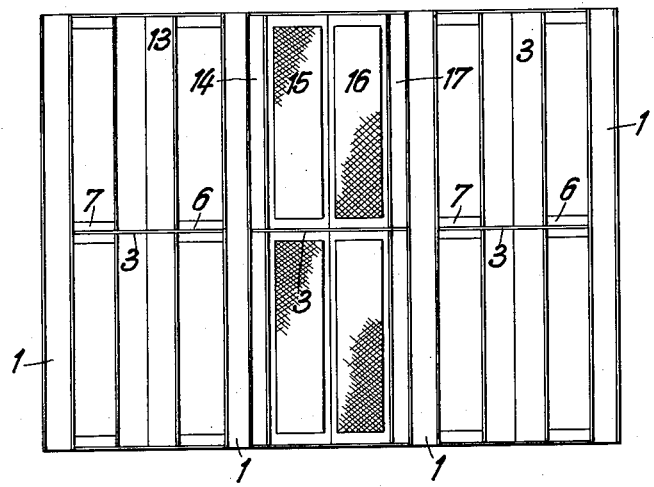
Fig. 8 is a front view of a filter section with cells according to Fig. 7.

Referring now to Fig. 1, the filter housing according to the invention comprises U-shaped channels 1 placed along the inlet-side boundaries of the cells and M-shaped channels 2 closing off the rows of superposed filter cells on the outlet side. Between the channels, trays 3 vertically spaced from one another are set at the required heights. The trays 3 are provided along their lengthwise edges with flanges 6 and 7 extending upwards and downwards, abutting on the inlet side against the flanges 4 and 5 respectively of the channels 1 and on the outlet side against the flanges 8 and 9 of channel 2. The trays 3 are attached to the channels by welding the two ends of flanges 6 and 7 to the edges of flanges 4 and 5 of channel 1 at one end and to the flanges 8 and 9 of the M-shaped channel 2 at the other end. The vertical flanges 6 and 7 of trays 3 do not extend over the entire edge length, but stop short so that the tray 3 will be flush with the extreme front of channels 1 and in contact with the web of channel 2. The closure frame for the filter frames to be set in wedge-fashion is formed on one side by channel flange 5, the top and bottom flange 6 of two vertically successive trays 3, and flange 8 of channel 2; and on the other side by channel flange 4, the top and bottom flange 7 respectively of the successive trays 3, and flange 9 of channel 2. This framework provides a complete seal against leakage of air between filter frames, so that no additional welding, on the trays for example, is required.

Fig. 6 shows a cross-section of a housing according to the invention, with three vertical rows of superposed filter cells placed side by side. For this purpose, the other flanges 11 and 10 of the channels 1 are fitted to additional trays, each requiring an additional channel 1 and an additional channel 2 on the outlet side. Using the inlet-side channels, outlet-side M-shaped channels, and interposed trays according to the invention, it is possible to build a filter housing constituting an integral unit, having the requisite tightness, possessing adequate strength, and constructed with an absolute minimum of welding work.

To construct a filter cell housing according to the invention, one has only to weld the flanges 6 and 7 to the flanges of channels 1 and 2. Only the topmost and bottommost trays require an additional weld on the projection 22 entering the channel 2 and on the edge portions 23 and 24 (Fig. 1) of the tray 3 to make a complete housing framework.

In the filter cell illustrated in Fig. 7, the web 12 of channel 13 is of such size that each side of the filter cell will accommodate filter frames 14, 15 and 16, 17 respectively. Frames 14 and 17 are fitted with fine filters, while frames 15 and 16 are for coarse filters.

Figure 9:
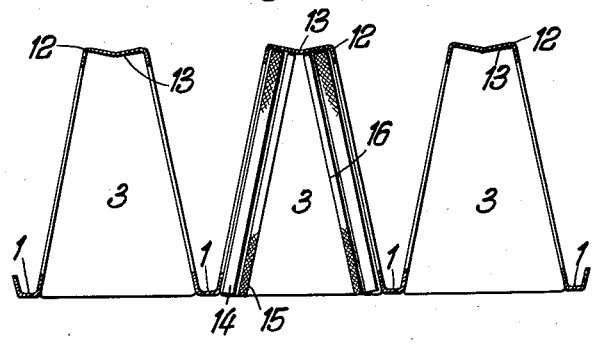
Fig. 9 is a sectional plan view of several adjacent filter cells according to Fig. 7.

Fig. 9 shows a cross section of three cells side-by-side, each equipped with two filter frames on a side. Fig. 8 shows a front view of a portion of the filter cell housing according to the invention, wherein the two vertically superposed central cells each has two filters, 14, 15 and 16, 17 respectively, on each side.

Figure 10:
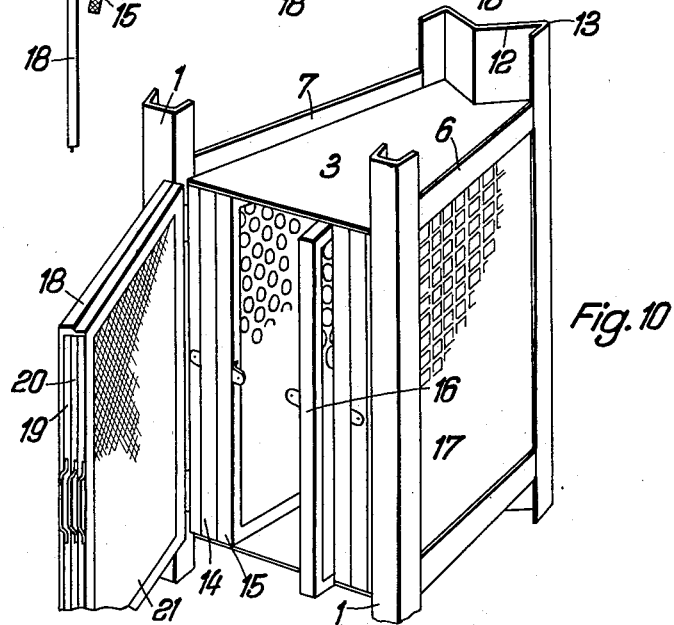
Fig. 10 is a perspective view of a filter cell according to Fig. 7 with a frame hung door-fashion to accommodate a pre-filter.

Fig. 10 shows a filter cell similar to Fig. 7, with a fine and a coarse filter on each side. On the left-hand channel 1, a frame 18 is hung, for closing the inlet aperture of the cell in the manner of a door. The frame 18 will accommodate pre-filters 19, 20, 21.

Figure 11:
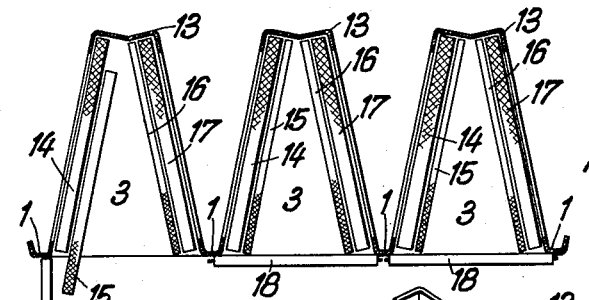
Fig. 11 is a sectional plan view of several adjacent filter cells according to Fig. 10.

Fig. 11 shows a cross section of several horizontally adjacent V-shaped filter cells, each equipped with fine filters 14, 17 and coarse filters 15, 16, and each having a frame 18 for pre-filters, hung on channels 1; the two right-hand cells being shown in closed condition.

Figure 12:
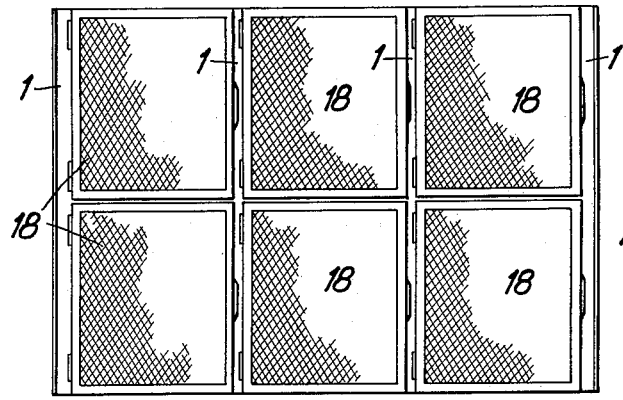
Fig. 12 is a front view corresponding to Fig. 11.

Fig. 12 shows a front view similar to Fig. 8, in which each filter cell is closed off by a frame 18 holding pre-filters 19, 20, 21.

Figure 13:
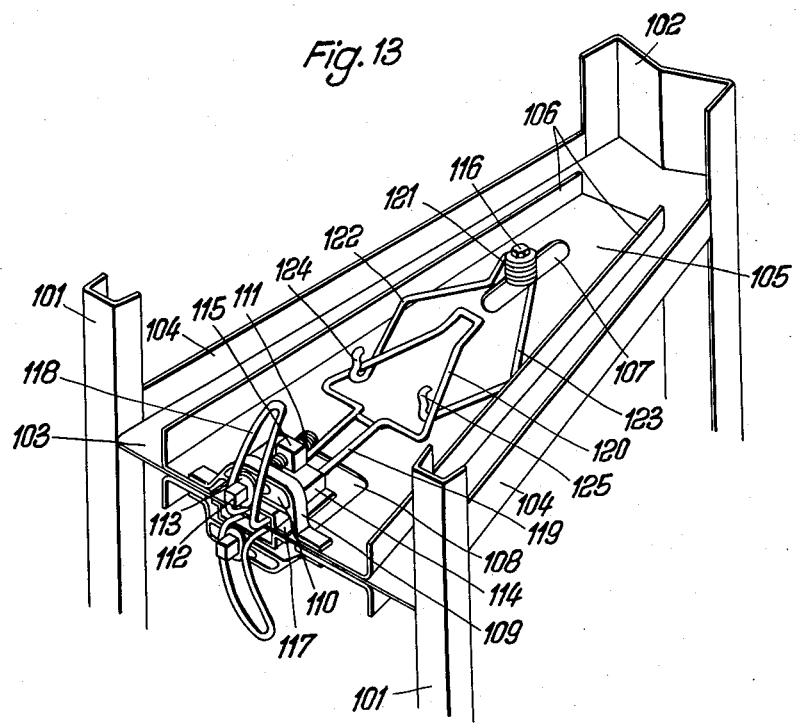
Fig. 13 is a perspective view of a portion of a V-shaped filter cell equipped with a clamping means according to the invention.

Fig. 13 again shows the V-shaped filter cell consisting of anterior channels 101 and posterior M-shaped channels 102. Between channels 101 and 102, a tray 103 is welded in place. The flanges 104 of the tray are welded to channels 101 and 102. The required surfaces of contact for the filters are provided by the flanges of channels 101 and 102 at the ends and by the flanges 104 along the side. There are secured to the top and bottom of tray 103 a pair of plates in a slidable manner, one of these plates being shown in Fig. 13 as plate 105 on top of the tray. The plates 105 have flanges 106 turned up on either side. The filters are accommodated between the flanges 104 of the housing and the corresponding flanges 106 of the plate 105. In its posterior, narrower portion, the plate 105 is provided with a slot 107. In front, the plate 105 has a cut-out 108. This cut-out 108 is bridged anteriorly by a strap 109 fixed to the plate 105. The strap 109 has an oblong hole 110 at the top. This hole 110 guides a screw 111. The screw 111 has a square head 112 with shoulder 113 in front. Within the cutout 108 of plate 105, the tray 103 bears another strap 114 supporting a nut 115 for the screw 111. When the screw 111 is turned to the left by means of the square head 112 the plate 105 will be pulled out forward by the rotation of screw 111. Upon rotation to the right, the plate 105 is pushed into the filter cell by the collar 113, thereby pressing the filters between flanges 106 and 104 against the housing. The pressure may be increased at will be suitably drawing up the screw 111.

The tray 103 bears a pin 116 sliding in the slot 107 of plate 105, permitting centered displacement of the plate. Underneath the strap 109 on the plate 105, the tray 103 bears another strap 117 retaining a handle 118 connected by rods 119 to a bow clamp 120. The strap 114 on tray 103 is so shaped as to help guide the rods 119 and handle 118. On pin 116, a coil spring 121 is mounted, with hooked ends 122 and 123, which in turn engage the bow clamp 120 by their hooks 124 and 125. When the handle 118 is operated to pull the rods 119 and bow 120 outward from the cell, then the oblique shape of the bow will press the hooked ends 122 and 123 together, so that the coarse-filter frames may be inserted between the flanges 106 of plate 105 and the ends 122 and 123. When the handle 119 and with it the bow 120 are thrust into the cell, the hooked ends 122 and 123 of spring 121 will spread apart; they bear upon the coarse-filter frames and press them, under the force of spring 121, tightly against the inside of the flanges of plate 105.

The mechanism according to the invention operates as follows. To insert the fine-filter frames, screw 111 is used to draw plate 105 forward enough so that the frames can be inserted in the space left between the flanges 104 of the housing and the flanges 106 of the plate 105. By turning screw 111 to the right, plate 105 is pushed into the cell, producing tight contact of the fine-filter frames with the filter housing. The pressure can be increased at will by drawing up the screw 111 sufficiently, so as to obtain a perfectly tight seal. To put in the coarse-filter frames, handle 118 is pulled out, the frames are inserted along the inside surfaces of flanges 106, and handle 118 is returned to its original position, whereupon the hooked ends 122, 123 of spring 121 will sufficiently tighten the coarse-filter frames.

Figure 14:
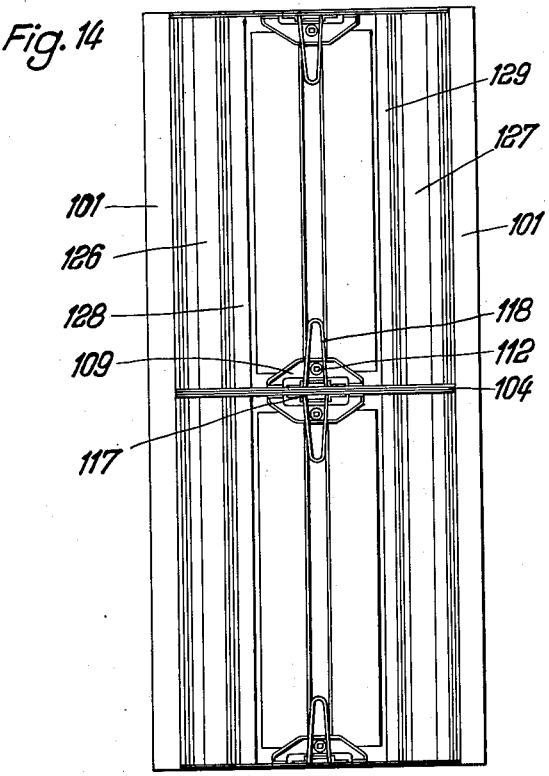
Fig. 14 is a front view of two superposed filter cells with fine and coarse filters inserted with the aid of clamping means according to Fig. 13.
Figure 15:
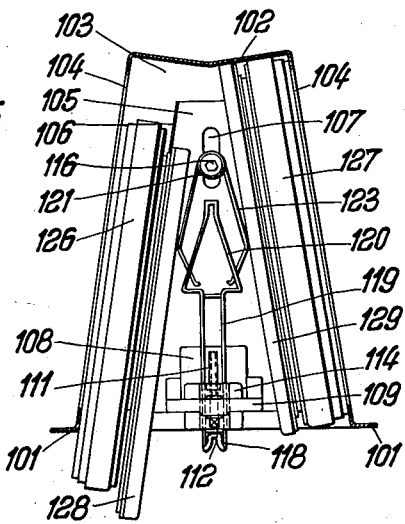
Fig. 15 is a top view corresponding to Fig. 14.

To change coarse filters, handle 118 is simply pulled out; then the coarse filters can easily be removed, with no risk of loosening the fine filters. If the fine filters are also clogged up, plate 105 is loosened by turning screw 111 to the left, and then the fine filters can be changed. The mode of operation will appear clearly from Figs. 14 and 15, showing a filter cell with both fine and coarse filters and their clamping means.

However, the arrangement according to the invention may optionally be used for either fine filters or coarse filters alone, omitting either the wedge-shaped clamping means for fine filters or the spring clamp for the coarse filters as required, without any changes in the cell parts or clamping means themselves. For the sake of clarity, Figs. 16 and 17 show a filter cell with clamping means for coarse filters only, and Figs. 18 and 19 the clamping means for fine filters in the same cell. Thus the device will accommodate coarse or fine filters or both without any change or adaptation of components.

What I claim is:

1. A V-shaped filter housing having an air inlet side and an air outlet side, comprising vertical limiting U-shaped channels arranged at said air inlet side and an M-shaped channel arranged at said air outlet side, substantially V-shaped horizontal trays having front edge portions and rear edge portions and permanently secured to and between said channels at predetermined spaced distances, thereby forming cells of predetermined measurement, said trays being disposed to form open dividing walls and adapted to receive on each side thereof at least a pair of filter units, each said pair comprising a coarse filter and a fine filter arranged in series, said dividing walls having spaced opposed longitudinal edges formed with upwardly and downwardly directed flanges welded at the trays' front edge portions and rear edge portions to the edges of said U- and M-shaped channels, and tension means centrally adjustably secured to the upper and lower faces of said trays, said tension means permitting a coarse filter to be arranged in series with a fine filter and to be pressed into position independently of each other.

2. The V-shaped filter housing according to claim 1, wherein each of the trays is provided at one of its ends with a projection engaging the M-shaped channel.

3. The V-shaped filter housing according to claim 2, wherein said tension means comprise a pair of substantially triangular plates slidably mounted on each side of said trays respectively, each of said plates being provided with flanges spaced parallelly from said upwardly and downwardly directed flanges and means for displacing said plates towards said M-shaped channel whereby the filters are pressed into position.

4. The V-shaped filter housing according to claim 3, wherein the pressing means for the fine-filter units consists of a wedge-shaped plate having upwardly directed spaced converging edges thereby forming an anterior wide portion, and a posterior narrow portion having a first slot, a guide pin received in said slot and secured to the cell bottom, a handle element, and a screw spindle, said anterior portion having a second slot and guide elements for said screw spindle and the handle secured to the cell bottom.

5. The V-shaped filter housing according to claim 4, wherein a first strap bridging for guiding the screw spindle is attached at the front portion of the wedge-shaped plate, said strap bridging projecting over said slot and serving as support for the screw spindle; and a second strap bridging secured within the slot on the cell bottom, a screw spindle nut borne on said second strap, said second strap bridging being of sufficient height to assure free passage of the tension element cooperating with the coarse-filter units.

6. The V-shaped filter housing according to claim 4, wherein the support of the screw spindle is formed as transversely directed horizontal oblong hole.

7. The V-shaped filter housing according to claim 6, wherein a guide strap frame actuating the tension spring is secured to the cell bottom below the support for the strap bridging carrying the screw spindle.

8. The V-shaped filter housing according to claim 7, wherein a pressure spring for the coarse-filter units is secured to the guide pin which is slidable in the slot of the wedge-shaped plate.

References Cited in the file of this patent
UNITED STATES PATENTS

| | | |
|---|---|---|
| 2,044,221 | Myers et al. | June 16, 1936 |
| 2,199,632 | Keyes | May 7, 1940 |
| 2,675,094 | Young | Apr. 13, 1954 |

FOREIGN PATENTS

| | | |
|---|---|---|
| 821,313 | Germany | Nov. 15, 1951 |